(12) United States Patent
Park

(10) Patent No.: US 8,419,258 B2
(45) Date of Patent: Apr. 16, 2013

(54) LIGHT GUIDE PLATE, AND BACKLIGHT UNIT

(75) Inventor: Jun Seok Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/069,617

(22) Filed: Mar. 23, 2011

(65) Prior Publication Data

US 2011/0211365 A1 Sep. 1, 2011

(30) Foreign Application Priority Data

Mar. 26, 2010 (KR) ........................ 10-2010-0027408

(51) Int. Cl.
*F21V 8/00* (2006.01)
*G02F 1/1335* (2006.01)

(52) U.S. Cl.
USPC ............ 362/616; 362/612; 362/268; 362/619

(58) Field of Classification Search ............... 362/616, 362/619, 625, 268, 331, 27, 614, 612; 349/65
See application file for complete search history.

(56) References Cited

U.S. PATENT DOCUMENTS

| | | | | |
|---|---|---|---|---|
| 6,144,424 A * | 11/2000 | Okuda et al. | ..................... | 349/65 |
| 6,206,535 B1 * | 3/2001 | Hattori et al. | ................. | 362/616 |
| 6,882,380 B2 * | 4/2005 | Yu et al. | ........................... | 349/61 |
| 7,824,091 B2 * | 11/2010 | Ijzerman et al. | .............. | 362/616 |
| 7,905,646 B2 * | 3/2011 | Adachi et al. | ................. | 362/601 |
| 7,954,990 B2 * | 6/2011 | Gourlay | ........................ | 362/616 |
| 8,021,032 B2 * | 9/2011 | Pei | ............................... | 362/612 |
| 2003/0063456 A1 * | 4/2003 | Katahira | ......................... | 362/27 |
| 2005/0168967 A1 * | 8/2005 | Kao et al. | ........................ | 362/27 |
| 2007/0147088 A1 * | 6/2007 | Chien et al. | ................... | 362/616 |
| 2008/0316770 A1 * | 12/2008 | Oku et al. | ...................... | 362/617 |
| 2009/0010023 A1 | 1/2009 | Kanade et al. | ............... | 362/606 |
| 2009/0316388 A1 * | 12/2009 | Chang | .......................... | 362/97.1 |
| 2010/0165254 A1 * | 7/2010 | Lee et al. | ....................... | 349/65 |
| 2011/0001901 A1 * | 1/2011 | Solomon et al. | ................ | 349/65 |

FOREIGN PATENT DOCUMENTS

| | | |
|---|---|---|
| EP | 0778 440 A2 | 6/1997 |
| JP | 08-240721 A | 9/1996 |
| JP | 09-189907 A | 7/1997 |
| JP | 2003-222863 A | 8/2003 |
| KR | 10-2006-0104513 A | 10/2006 |
| KR | 10-2008-0021848 A | 3/2008 |
| WO | WO 02/084173 A1 | 10/2002 |
| WO | WO 2009/076125 A1 | 6/2009 |

OTHER PUBLICATIONS

European Search Report dated Jul. 26, 2011 issued in Application No. 11 15 9310.

* cited by examiner

*Primary Examiner* — Peggy A. Neils
(74) *Attorney, Agent, or Firm* — KED & Associates, LLP

(57) ABSTRACT

A light guide plat and a backlight device are provided. The backlight device may include a guide plate include a first light guide having a first inclined plane and a second light guide having a second inclined plane facing the first inclined plane. A refractive index of the second light guide may be different from that of the first light guide. An optical device may be provided on the light guide plate. A first light emitting module may be provided at a lateral surface of the first light guide and a second light emitting module may be provided at a lateral surface of the second light guide. A reflective device may be provided below the second light guide.

15 Claims, 2 Drawing Sheets

LIGHT GUIDE PLATE, AND BACKLIGHT UNIT

CROSS-REFERENCE TO RELATED APPLICATIONS

The present application claims priority under 35 U.S.C. 119 and 35 U.S.C. 365 to Korean Patent Application No. 10-2010-0027408 (filed on Mar. 26, 2010), which is hereby incorporated by reference in its entirety.

BACKGROUND

Embodiments relate to a light guide plate, and a backlight unit having the same.

A display device comprises a cathode ray tube (CRT), a liquid crystal display (LCD), a plasma display panel (PDP) and an electro luminescence display (ELD). And the study of the liquid crystal display is progressing dynamically.

The liquid crystal display displays the image to control the amount of the light from outside because the liquid crystal display is mostly a received light device. So, the liquid crystal display needs the light source to generate and emit the light to LCD panel.

SUMMARY

Embodiments provide a light guide plate comprising: a first light guide member including a first inclined plane; and a second light guide member including a second inclined plane and having a refractive index different from that of the first light guide member. The first light guide member is located on the second light guide member to face the first inclined plane and the second inclined plane each other, and the first light guide member and the second light guide member receive light from a light source through each of lateral surfaces of the first light guide member and the second light guide member.

Embodiments provide a backlight unit comprising; a light guide plate comprising a first light guide member having a first inclined plane and a second light guide member having a second inclined plane and having a refractive index different from that of the first light guide member, and the first light guide member located on the second light guide member to face the first inclined plane and the second inclined plane; an optical member on the light guide plate; a first light emitting module located at a lateral surface of the first light guide member; a second light emitting module located at a lateral surface of the second light guide member; and a reflective member located below the second light guide member.

The backlight unit according to the embodiment can provide the mixing light selectively to mix the lights from the light emitting modules having different color coordinates.

The details of one or more embodiments are set forth in the accompanying drawings and the description below. Other features will be apparent from the description and drawings, and from the claims.

DETAILED DESCRIPTION OF THE EMBODIMENTS

Figure 1:
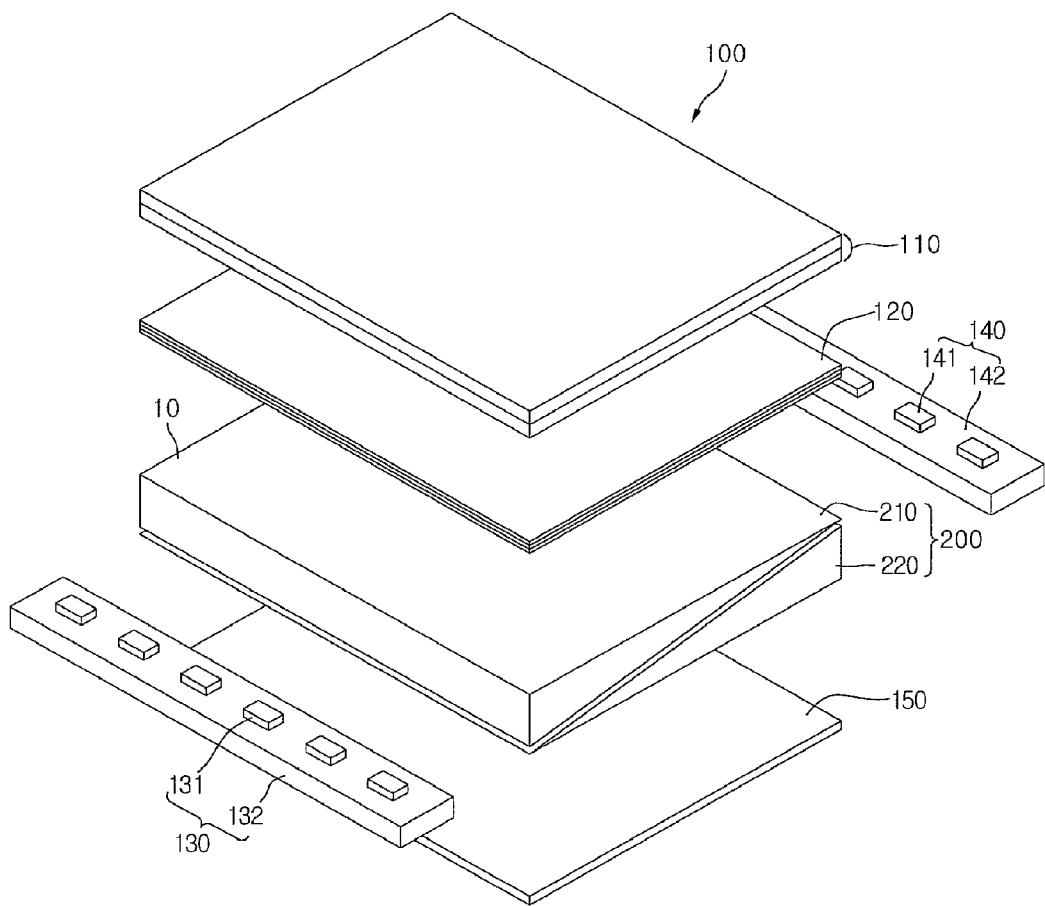
FIG. 1 is a view of a backlight unit according to an embodiment.

In the descriptions of embodiments, it will be understood that when a layer (or film), a region, a pattern, or a structure is referred to as being 'on' a substrate, a layer (or film), a region, a pad, or patterns, it can be directly on another layer or substrate, or intervening layers may also be present. Further, it will be understood that when a layer is referred to as being 'under' another layer, it can be directly under another layer, and one or more intervening layers may also be present. Further, the reference about 'on' and 'under' each layer will be made on the basis of drawings.

In the drawings, the thickness or size of each layer is exaggerated, omitted, or schematically illustrated for convenience in description and clarity. Also, the size of each element does not entirely reflect an actual size.

Hereinafter, a backlight unit according to embodiments will be described with reference to accompanying drawings.

FIG. 1 is a view of a backlight unit according to an embodiment.

Referring to FIG. 1, the display device 100 includes a display panel 110 displaying the image, and a backlight unit irradiating the light to the display panel 110.

The display panel 110 is not described in detail in the drawings, for example, the display panel 110 may include an upper substrate and lower substrate faced each other to maintain a uniform cell gap therebetween, and a liquid crystal layer provided between the upper substrate and the lower substrate. A plurality of gate lines and a plurality of data lines intersected the gate lines are formed on the lower substrate, and a thin film transistor may be formed at the intersection of the gate lines and the data lines. A color filter may be formed on the upper substrate. The above structure of the display panel 110 is an example and the embodiment is not limited thereto.

For another example, the lower substrate may include a color filter, as well as the thin film transistor. And, the display panel 110 may have various structures according to driving methods of the liquid crystal layer.

And, a gate driving PCB (printed circuit board)(not shown) to supply a scan signal to the gate lines and a data driving PCB (printed circuit board) (not shown) to supply a data signal to the data lines are formed at the edge of the display panel 110.

And a polarized light film (not shown) may be located on or below the display panel 110.

An optical sheet 120 may be provided between the display panel 110 and the backlight unit. The optical sheet 120 may be eliminated and the embodiment is not limited thereto.

The optical sheet 120 may include at least one of a diffusion sheet (not shown), a prism sheet (not shown), and a fluorescent sheet (not shown). In this case, the diffusion sheet uniformly diffuses the light emitted from the light guide plate 200 such that the diffused light can be concentrated onto the display panel 110 by the prism sheet. The prism sheet may include a horizontal and/or vertical prism sheet and one more brightness enhancement film.

The fluorescent sheet generates different color light by passing the light from the light emitting diode therethrough. The optical sheet 120 is an example and the embodiment is not limited thereto.

The backlight unit includes light emitting modules 130 and 140, a light guide plate 200 to guide the light received through the lateral surface from light emitting modules 130 and 140 to the upper surface, and the reflective sheet 150 disposed under the light guide plate 200 to reflect the light toward the display panel 110.

And, a bottom cover (not shown) may be introduced to receive the backlight unit 130.

A light guide plate 200 includes a first light guide member 210 and a second light guide member 220 having each inclined plane.

The light emitting modules 130 and 140 include a first light emitting module 130 generating the light toward the lateral surface 212 of the first light guide member 210 and a second light emitting module 140 generating the light toward the lateral surface 222 of the second light guide member 220.

In the embodiment, the first light guide member 210 has a first inclined plane 211, and the second light guide member 220 has a second inclined plane 221. However, each light guide member 210 and 220 may have several inclined planes.

The number of the light guide members 210 and 220 is same to the number of the light emitting modules.

And, each light emitting module 130 and 140 includes at least one light emitting diode 131 and 141 and module substrates 132 and 142 where the light emitting diodes 131 and 141 mount.

The light emitting diode (LED)s 131 and 141 may be color LEDs such as red LEDs, blue LEDs, green LEDs and white LEDs, or UV-LEDs, but the embodiment is not limited thereto.

The first light emitting diode 131 and the second light emitting diode 141 are formed of same color LEDs or different color LEDs.

For the various color, the different color lights are introduced to the light guide plates 200 so that the lights may be mixed and transferred to the display panel 110.

The module substrates 132 and 142 may be formed of a metal cored PCB, FR-4 PCB, common PCB or ceramic substrate, but the embodiment is not limited thereto.

Hereinafter, the light guide plate 200 will be described with reference to FIG. 2 in more detail.

Figure 2:
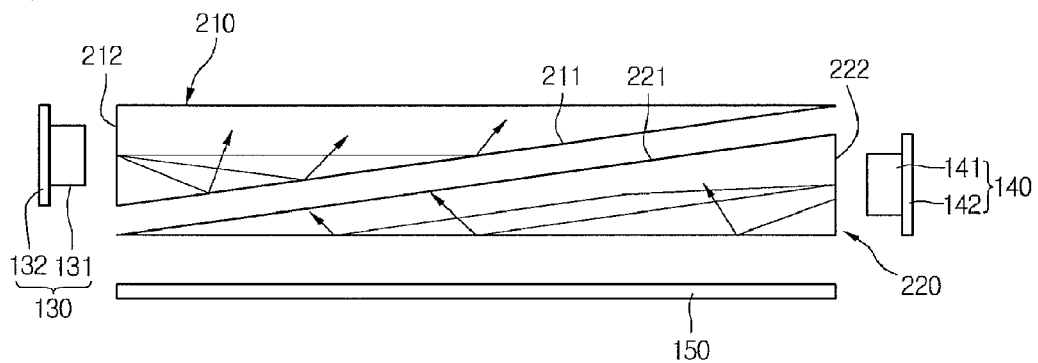
FIG. 2 is a view of a light guide plate having a first light guide member and a second light guide member.

Referring to FIG. 2, the side view of the second light guide member 220 over the reflective sheet 150 and the first light guide member 210 over the second light guide member 220 is shown.

The first light emitting module 130 is located at a lateral surface 212 of the first light guide member 210, and the lateral surface 212 introduces the light from the first light emitting module 130. And a second light emitting module 140 is located at a lateral surface 222 of the second light guide member 220, and the lateral surface 222 introduces the light from the second light emitting module 140.

Moreover, the second light guide member 220 is formed of a material having a higher refractive index than the first light guide member 210, and the second light guide member 220 is located below the first light guide member 210. So the refractive index deference between the second light guide member 220 and the air may become bigger so that the lights are reflected better at the lower surface of the second light guide member 220.

The second light guide member 220 has the inclined plane 221 toward the display panel 110, and the first light guide member 210 has the inclined plane 211 toward the second light guide member 220.

Hereinafter, the inclined plane 221 of the second light guide member 220 will be named of a second inclined plane 221, and the inclined plane 211 of the first light guide member 210 will be named of a first inclined plane 211. The first and second light guide members 210 and 220 are located to face the first inclined plane 211 and the second inclined plane 221 each other, and the reflective sheet 150 is located below the second light guide member 220.

So, the light generated from the first light emitting module 130 is introduced to the inside of the light guide plate 200 through the lateral surface 212 of the first light guide member 210, and reflected at the first inclined plane 211 of the first light guide member 210 to transfer to the display panel 110.

And, the light generated from the second light emitting module 140 is introduced to the inside of the light guide plate 200 through the lateral surface 222 of the second light guide member 220, and reflected at the lower surface of the second light guide member 220 to transfer to the display panel 110.

So, the light from the first light guide member 210 is made by mixing the light from the first light emitting module 130 and the light from the second light emitting module 140.

The color of the mixed light can be changed according to the kind of the light emitting diodes 131 and 141 forming the first and the second light emitting modules 130 and 140.

So, the backlight unit and the display device can be provided to make a various color coordinate.

Figure 3:
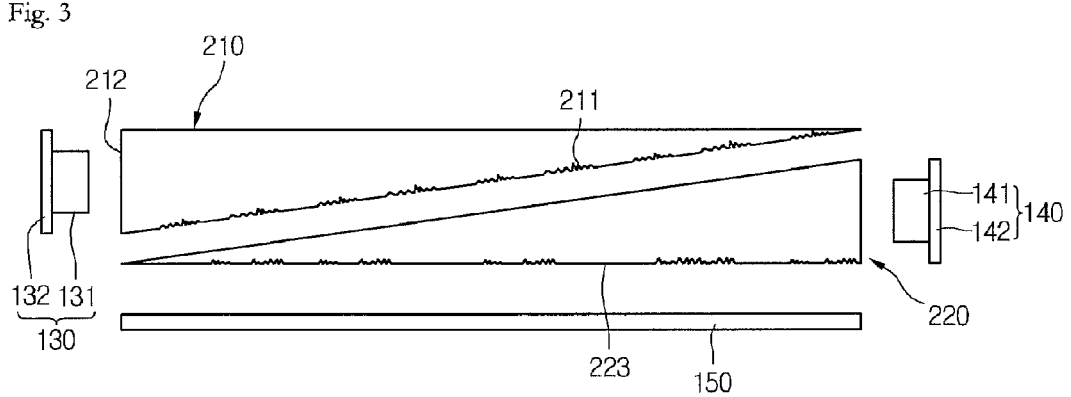
FIGS. 3 to 5 are views of a light guide plate according to other embodiments.
Figure 4:
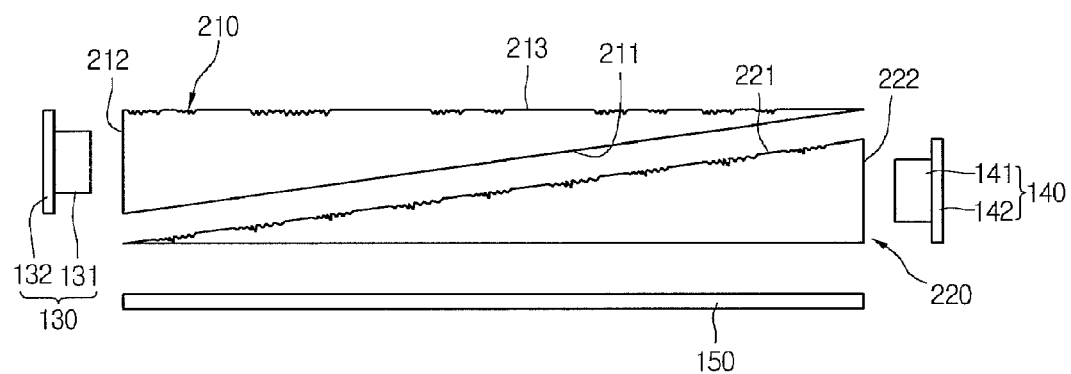
Figure 5:
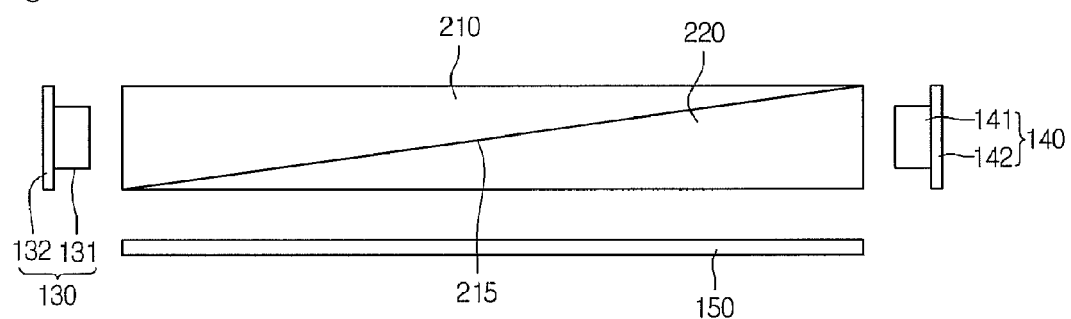

FIGS. 3 to 5 are views of a light guide plate according to other embodiments.

First of all, as shown in FIG. 3, a plurality of the small size patterns are formed on the first inclined plane 211 of the first light guide member 210, and a plurality of the small size patterns are formed on the lower surface 223 of the second light guide member 220 in the embodiment.

The patterned part formed on the first inclined plane 211 diffuses the light inputted to the first light guide member 210, and the patterned part formed on the lower surface 223 diffuses the light inputted to the second light guide member 220.

Precisely, the first inclined plane 211 having the patterned part may diffuse the first light generated from the first light emitting module 130, or diffuse the first and the second light reflected and reinputted by the reflective sheet 150.

And, the lower surface 223 having the patterned part may diffuse the second light generated from the second light emitting module 140, or diffuse the first and the second light reflected and reinputted by the reflective sheet 150.

Meanwhile, as shown in FIG. 4, a plurality of the small size patterns are formed on the upper surface 213 of the first light guide member 210, and a plurality of the small size patterns are formed on the second inclined plane 221 of the second light guide member 220 in the embodiment.

The patterned part diffusing the light inputted to the first light guide member 210 is formed on the upper surface 213, and the patterned part diffusing the light inputted to the second light guide member 220 is formed on the second inclined plane 221.

Specifically, the upper surface 213 having the patterned part may diffuse the first light generated from the first light emitting module 130, or diffuse the first and the second light reflected and reinputted by the reflective sheet 150.

And, the second inclined plane 221 having the patterned part may diffuse the second light generated from the second light emitting module 140, or diffuse the first and the second light reflected and reinputted by the reflective sheet 150.

Meanwhile, as shown in FIG. 5, the first inclined plane of the first light guide member 210 and the second inclined plane of the second light guide member 220 contact each other directly to form the common inclined plane 215 in the embodiment.

The first light guide member 210 and the second light guide member 220 contact each other directly without other member like a reflective sheet or the air layer therebetween. Therefore, the refractive indexes of the first and second light guide members 210 and 220 may become smaller toward the air layer over the first light guide member 210, and the light may be emitted to the first light guide member 210.

The first and second light guide members 210 and 220 may have a plurality of the small size patterns on the upper, lower or the inclined planes, as shown in FIG. 3 or FIG. 4.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight device, comprising;
a first light guide including an upper surface, a first side surface having a first end coupled to a first end of the upper surface and perpendicular to the upper surface, and a first inclined surface coupled between a second end of the upper surface and a second end of the first side surface;
a second light guide including a lower surface parallel to the upper surface of the first light guide, a second side surface having a first end coupled to a first end of the lower surface and being parallel to the first side surface of the first light guide and perpendicular to the lower surface, and a second inclined surface coupled between a second end of the lower surface and a second end of the second side surface, the first inclined surface of the first light guide being spaced apart from the second inclined surface of the second light guide;
an optical device provided on the light guide plate;
a first light emitting module positioned at the first side surface of the first light guide, the first light emitting module including a first substrate oriented in parallel to the first side surface of the first light guide and at least one light emitting diode mounted on the first substrate;
a second light emitting module positioned at the second side surface of the second light guide, the second light emitting module including a second substrate oriented in parallel to the second side surface of the second light guide and at least one light emitting diode mounted on the second substrate; and
a reflective device provided below the second light guide,
wherein the at least one light emitting diode of the first light emitting module and the first light guide are disposed along a first horizontal line and the at least one light emitting diode of the second light emitting module and the second light guide are disposed along a second horizontal line that is positioned below the first horizontal line, and
wherein a refractive index of the second light guide is higher than that of the first light guide.

2. The backlight device of claim 1, wherein a light emitting diode of the first light emitting module and a light emitting diode of the second light emitting module generate different colors.

3. The backlight device of claim 1, wherein the upper surface of the first light guide includes a plurality of patterns.

4. The backlight device of claim 1, wherein the lower surface of the second light guide includes a plurality of patterns.

5. The backlight device of claim 1, wherein the second light guide is formed of a material having a higher refractive index than that of the first light guide.

6. The backlight device of claim 1, wherein the optical device includes at least one of a diffusion sheet, a prism sheet, or a fluorescent sheet.

7. The backlight device of claim 1, wherein the backlight device irradiates light to a display panel provided on the optical device.

8. The backlight device of claim 1, wherein the at least one light emitting diode mounted on the first substrate emits a different color than that emitted by the at least one light emitting diode mounted on the second substrate.

9. The backlight device of claim 1, wherein a cross section of the first guide member is triangular.

10. The backlight device of claim 9, wherein a cross section of the second guide member is triangular.

11. The backlight device of claim 10, further comprising a plurality of diffusion patterns formed on the upper surface of the first light guide.

12. The backlight device of claim 1, wherein the second inclined surface of the second light guide includes a plurality of patterns.

13. The backlight device of claim 1, wherein the first inclined surface of the first light guide includes a plurality of patterns.

14. The backlight device of claim 1, wherein the at least one light emitting diode of the first light emitting module emits a first light such that the first light is incident upon the first side surface of the first light guide and is diffused by a plurality of first patterns of the upper surface of the first light guide and the at least one light emitting diode of the second light emitting module emits a second light such that the second light is incident upon the second side surface of the second light guide and is diffused by a plurality of the second patterns of the second inclined surface of the second light guide.

15. The backlight device of claim 1, wherein the upper surface of the first light guide includes a plurality of first patterns, and the second inclined surface of the second light guide includes a plurality of second patterns.

* * * * *